United States Patent
Kawabe et al.

(10) Patent No.: US 10,066,569 B2
(45) Date of Patent: Sep. 4, 2018

(54) ENGINE CONTROL DEVICE THAT CONTROLS AMOUNT OF FUEL INJECTED FROM PORT INJECTION VALVE AND CYLINDER INJECTION VALVE BASED ON LOAD

(71) Applicant: MITSUBISHI JIDOSHA KOGYO KABUSHIKI KAISHA, Tokyo (JP)

(72) Inventors: Takashi Kawabe, Tokyo (JP); Koji Hata, Tokyo (JP); Fumiaki Hiraishi, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 298 days.

(21) Appl. No.: 14/892,878

(22) PCT Filed: Mar. 6, 2014

(86) PCT No.: PCT/JP2014/055766
§ 371 (c)(1),
(2) Date: Nov. 20, 2015

(87) PCT Pub. No.: WO2014/208138
PCT Pub. Date: Dec. 31, 2014

(65) Prior Publication Data
US 2016/0123268 A1    May 5, 2016

(30) Foreign Application Priority Data
Jun. 28, 2013  (JP) ................. 2013-136575

(51) Int. Cl.
*F02D 41/30*    (2006.01)
*F02D 41/40*    (2006.01)
(Continued)

(52) U.S. Cl.
CPC ............ *F02D 41/3094* (2013.01); *F01L 1/34* (2013.01); *F02D 13/0261* (2013.01);
(Continued)

(58) Field of Classification Search
CPC .. F01L 1/34; F02D 13/0261; F02D 2041/001; F02D 2041/389; F02D 23/02;
(Continued)

(56) References Cited

U.S. PATENT DOCUMENTS 5,438,967 A * 8/1995 Ito ..................... F02B 23/104
                                              123/339.12
5,875,743 A * 3/1999 Dickey ................. F02B 1/12
                                              123/25 C
(Continued)

FOREIGN PATENT DOCUMENTS

DE   10 2008 044 242 A1   6/2010
JP         04-237854 A    8/1992
(Continued)

OTHER PUBLICATIONS

171101 Machine Translation JP 2006 348799.pdf.*
(Continued)

*Primary Examiner* — Hieu T Vo
*Assistant Examiner* — Carl Staubach
(74) *Attorney, Agent, or Firm* — Birch, Stewart, Kolasch & Birch, LLP

(57) ABSTRACT

An engine control device for an engine provided with a supercharger, including a cylinder injection valve and a port injection valve. The device includes an injection controller that controls injections of fuel through the cylinder injection valve and through the port injection valve, on the basis of at least a load on an engine. The injection controller, in a low load operating state, causes the fuel to be injected through the port injection valve; in an intermediate load operating (Continued)

state, causes the fuel to be injected through the cylinder injection valve during an intake stroke, and causes the fuel to be injected through the port injection valve; and in a high load operating state, causes the fuel to be injected through the cylinder injection valve at least during an intake stroke and during a compression stroke.

3 Claims, 8 Drawing Sheets

(51) Int. Cl.
  *F02D 23/02*   (2006.01)
  *F02D 13/02*   (2006.01)
  *F01L 1/34*   (2006.01)
  *F02D 41/10*   (2006.01)
  *F02M 69/04*   (2006.01)
  *F02D 41/00*   (2006.01)
  *F02D 41/38*   (2006.01)

(52) U.S. Cl.
  CPC ......... *F02D 23/02* (2013.01); *F02D 41/0007* (2013.01); *F02D 41/102* (2013.01); *F02D 41/107* (2013.01); *F02D 41/3029* (2013.01); *F02D 41/402* (2013.01); *F02D 2041/001* (2013.01); *F02D 2041/389* (2013.01); *F02M 69/046* (2013.01); *Y02T 10/144* (2013.01); *Y02T 10/18* (2013.01); *Y02T 10/44* (2013.01)

(58) Field of Classification Search
  CPC .. F02D 41/0007; F02D 41/102; F02D 41/107; F02D 41/3029; F02D 41/3094; F02D 41/402; F02M 69/046; Y02T 10/144; Y02T 10/18
  See application file for complete search history.

(56) References Cited

U.S. PATENT DOCUMENTS

| | | | | |
|---|---|---|---|---|
| 6,561,157 B2 * | 5/2003 | zur Loye | ................. | F02B 1/04 123/295 |
| 6,810,844 B2 * | 11/2004 | Sellnau | ................... | F01L 1/08 123/90.16 |
| 7,178,506 B2 | 2/2007 | Kojima et al. | | |
| 7,409,926 B2 * | 8/2008 | Sun | ................. | F02D 19/081 123/1 A |
| 9,353,697 B2 * | 5/2016 | Kawabe | ................. | F02D 41/34 |
| 9,482,168 B2 * | 11/2016 | Dunn | ................. | F02D 41/3094 |
| 9,518,517 B2 * | 12/2016 | Kawabe | ................. | F02D 13/0261 |
| 9,574,513 B2 * | 2/2017 | Kawabe | ................. | F02D 41/34 |
| 2005/0098157 A1 * | 5/2005 | Ohtani | ................. | F02D 41/3029 123/431 |
| 2005/0268889 A1 | 12/2005 | Kojima et al. | | |
| 2006/0021422 A1 * | 2/2006 | Demura | ................. | F02D 35/027 73/35.01 |
| 2006/0037583 A1 * | 2/2006 | Tanaka | ................. | F02D 41/3094 123/406.47 |
| 2006/0096572 A1 * | 5/2006 | Satou | ................... | F02D 41/024 123/295 |
| 2006/0107650 A1 * | 5/2006 | Tokuda | ............... | F02D 41/3029 60/284 |
| 2009/0099753 A1 * | 4/2009 | Kaneko | ............... | F02D 41/1475 701/103 |
| 2010/0147261 A1 * | 6/2010 | Yamaguchi | ............. | F02B 17/00 123/295 |
| 2014/0230792 A1 | 8/2014 | Kawabe et al. | | |
| 2015/0267634 A1 * | 9/2015 | Mashiki | ............. | F02D 41/0057 123/295 |
| 2016/0032860 A1 * | 2/2016 | Mano | ................. | F02D 41/3094 123/478 |
| 2016/0084150 A1 * | 3/2016 | Kawabe | ............. | F02D 41/3094 123/294 |

FOREIGN PATENT DOCUMENTS

| | | |
|---|---|---|
| JP | 2004-270583 A | 9/2004 |
| JP | 2005-133663 A | 5/2005 |
| JP | 2005-201113 A | 7/2005 |
| JP | 2005-325806 A | 11/2005 |
| JP | 2005-330943 A | 12/2005 |
| JP | 2006-348799 A | 12/2006 |
| JP | 2009-299691 A | 12/2009 |
| JP | 2011-247156 A | 12/2011 |
| JP | 2013-087755 A | 5/2013 |
| WO | WO 2013/073345 A1 | 5/2013 |

OTHER PUBLICATIONS

Office Action dated Jun. 26, 2017 for counterpart Chinese Patent Application No. 201480037155.0 with an English Translation.
Extended European Search Report dated Feb. 3, 2017 in corresponding European Patent Application No. 14816816.4.

* cited by examiner

ENGINE CONTROL DEVICE THAT CONTROLS AMOUNT OF FUEL INJECTED FROM PORT INJECTION VALVE AND CYLINDER INJECTION VALVE BASED ON LOAD

TECHNICAL FIELD

The present invention relates to an engine control device for an engine including a cylinder injection valve for injecting a fuel directly into a cylinder, and a port injection valve for injecting the fuel into an intake port.

TECHNICAL FIELD

Conventionally, engines with a dual fuel injection mode have been proposed, which combine a cylinder injection in which fuel is injected directly into a cylinder from a cylinder injection valve and a port injection in which the fuel is injected into an intake port from a port injection valve. Such engines employ a homogeneous combustion to combust fuel-air mixture in a homogenous concentration distribution inside a cylinder, and a stratified charge combustion to combust a fuel-air mixture in a high concentration, distributed ununiformly and forming a stratum in the vicinity of a spark plug. Typically, fuel injections are controlled such that a port injection is carried out primarily during the homogeneous combustion, whereas a cylinder injection is carried out primarily during the stratified charge combustion.

As an example, Patent Document 1 discloses an engine which produces a stratified charge combustion by a cylinder injection under a lower load, whereas producing a homogeneous combustion by a port injection under a higher load. This engine initiates the cylinder injection during an intake stroke when the load becomes lower than the predetermined load for initiating the port injection, thereby ensuring that fuel sufficient for the combustion with the cylinder injection is supplied, even when some fuel supplied in the port injection adheres the inner wall of an intake pipe.

RELATED ART DOCUMENT

Patent Document

Patent Document 1: Japanese Patent Laid-Open Publication No. Hei 4-237854

SUMMARY OF INVENTION

Problem to be Solved by Invention

Some of engines employing a combination of cylinder and port injections provide a valve overlap period during which the duration of an intake valve opening overlaps with the duration of an exhaust valve opening, for the purpose of improving the scavenging efficiency of the combustion gases and the volumetric efficiency of the intake air. Particularly in engines provided with a supercharger in the intake and exhaust systems, longer valve overlap periods can improve the volumetric efficiency, resulting in increased engine outputs. For extending those valve overlap periods, techniques have been developed for varying open/close timings of intake and exhaust valves in an engine, thereby adjusting the valve overlap periods depending on parameters, such as the engine load.

A longer valve overlap period, however, often induces a phenomenon, known as blow-by, in which air from an intake path directly enters an exhaust path. Such blow-by may incur reductions in the engine output and the exhaust performance, since fuel supplied in a port injection passes through the cylinder and flows toward the exhaust path. Particularly, such blow-by tends to take place when the intake air is supercharged by a supercharger.

Accordingly, in an engine employing a combination of cylinder and port injections, in which valve overlap periods are provided, it is desired to optimize respective fuel injection timings and fuel injection ratios, for taking full advantage of the two injection schemes, as well as appropriately carrying out fuel injections for addressing the issue of blow-by during valve overlap periods.

The present embodiment was conceived of in light of the above issues, and an object thereof is to provide an engine control device for an engine employing a combination of cylinder and port injections, which takes advantage of the two injection schemes. The object is not limited to the aforementioned one, and provision of advantages and effects that are achievable by configurations described in the following Modes for Carrying out the Invention, but are not realized with conventional techniques, are also regarded as other objects of the present embodiment.

Solutions to Problem (1) An engine control device disclosed herein is an engine control device for an engine provided with a supercharger, the engine including a cylinder injection valve for injecting a fuel into a cylinder in the engine; and a port injection valve for injecting the fuel into an intake port of the cylinder, the engine control device including an injection controller that controls injections of the fuel through the cylinder injection valve and through the port injection valve, on the basis of at least a load on the engine.

The injection controller, in a low load operating state, causes the fuel to be injected through the port injection valve; in an intermediate load operating state, causes the fuel to be injected through the cylinder injection valve during an intake stroke, and causes the fuel to be injected through the port injection valve; and in a high load operating state, causes the fuel to be injected through the cylinder injection valve at least during an intake stroke and during a compression stroke.

As used therein, the "load on the engine" represents the force, power (engine output, horsepower), work (energy), and the like, which impose resistance on the engine. Typically, an engine output requested to the engine or any other parameters correlated thereto, are handled as the load. Specific examples of the load include the filling efficiency, the volumetric efficiency, the target torque of the engine, the intake pressure and the exhaust pressure, the supercharging pressure, the vehicle speed, the accelerator opening, an operating state of an external load device, and information on the driving environment of the vehicle.

Furthermore, the "low load operating state" refers to the state where the load on the engine is smaller than a predetermined first load. The "first load" refers to a value that is approximately equal to or a little smaller than the predetermined load that is the threshold for determining whether or not supercharging by the supercharger is activated. The "intermediate load operating state" refers to the state where the load on the engine is equal to or greater than the first load and is smaller than a predetermined second load. The "second load" is greater than the first load, and is approximately 80% of the total load, for example. The "high load operating state" refers to the state where the load on the engine is equal to or greater than the second load.

(2) Preferably, the injection controller increases a ratio of an amount of the fuel to be injected through the port injection valve, as a rotation speed of the engine increases, in the high load operating state.

(3) Preferably, the injection controller sets a ratio of an amount of the fuel to be injected through the port injection valve to an amount of the fuel to be injected through the cylinder injection valve, to 1 or less, in the high load operating state.

(4) Preferably, the injection controller sets an amount of the fuel to be injected through the port injection valve to 0 when the engine is at a low rotation speed, in the high load operating state. Note that "when the engine is at a low rotation speed" refers to the state where the rotation speed is smaller than a predetermined first rotation speed. The "first rotation speed" is a value that is greater than 0, and is equivalent to or greater than the idle rotation speed, for example.

(5) Preferably, the engine includes a variable valve actuating mechanism that varies open/close timing of at least one of an intake valve and an exhaust valve of the engine. In this configuration, the control device preferably includes a variable valve controller that controls the variable valve actuating mechanism on the basis of the load. The variable valve controller preferably provides a valve overlap period for opening both the intake valve and the exhaust valve, at least in the high load operating state.

In other words, the engine control device for the engine including the variable valve actuating mechanism that varies open/close timing of at least one of the intake valve and the exhaust valve, preferably includes the variable valve controller that controls the variable valve actuating mechanism on the basis of the load, and the variable valve controller preferably provides a valve overlap period for opening both the intake valve and the exhaust valve, at least in the high load operating state.

(6) Preferably, the injection controller causes, even in the high load operating state, the fuel to be injected through the port injection valve, and causes the fuel to be injected through the cylinder injection valve only during the intake stroke, when the engine is at a high rotation speed. Note that "when the engine is at a high rotation speed" refers to the state where the rotation speed is equal to or greater than a second rotation speed. The "second rotation speed" is a value that is greater than the first rotation speed, and is smaller than the maximum rotation speed of the engine.

Advantageous Effects of Invention

In accordance with this engine control device, it is possible to make use of the advantage of the cylinder injection and the advantage of the port injection, enabling both provision of a higher output and provision of an excellent exhaust performance.

MODE FOR CARRYING OUT THE INVENTION

Hereinafter, an embodiment will be described with reference to the drawings. It is noted that the embodiment described below is merely exemplary, and it is not intended to exclude various modifications and applications of the techniques that are not explicitly described in the following embodiment.

[1. Apparatus Configuration]

[1-1. Engine]

Figure 1:
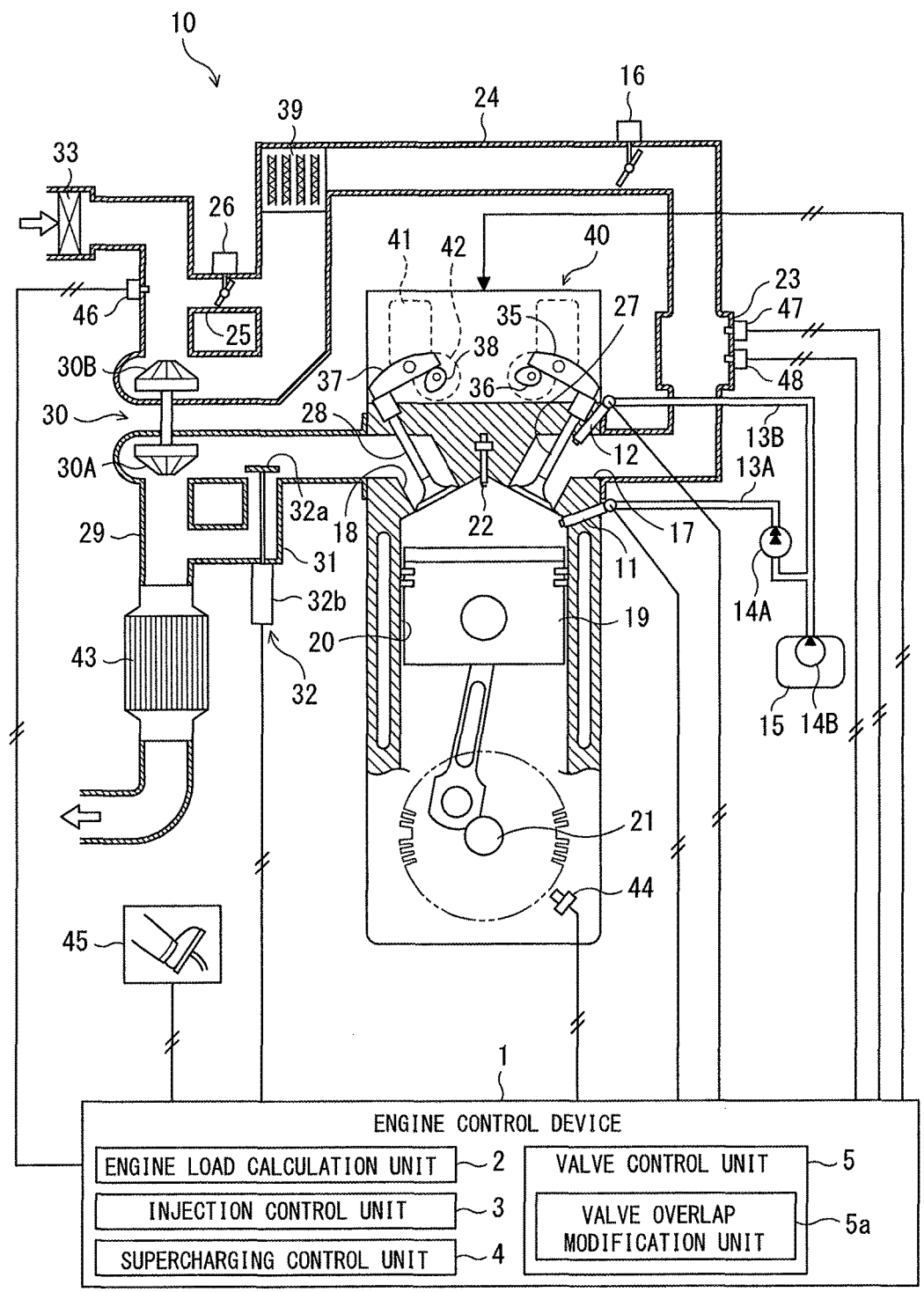
FIG. 1 is a diagram exemplifying a block configuration of an engine control device in accordance with one embodiment, and a configuration of an engine to which this control device is applied.

An engine control device of the present embodiment is applied to a gasoline engine 10 (hereinafter, briefly referred to as the "engine 10") that is provided in a vehicle shown in FIG. 1. The engine 10 is a four-stroke cycle engine that is provided with a fuel injection system employing a combination of a port injection and a cylinder injection, and a supercharging system utilizing the exhaust pressure. FIG. 1 shows one of multiple cylinders 20 provided in the multi-cylinder engine 10. The cylinder 20 is provided with a piston 19 so as to be slidable therein, and the reciprocating motion by the piston 19 is converted into a rotational motion of a crank shaft 21 via a connecting rod.

At the top of each cylinder 20, an intake port 17 and an exhaust port 18 are provided. An intake valve 27 is provided to an opening of the intake port 17, and an exhaust valve 28 is provided to an opening of the exhaust port 18. Between the intake port 17 and the exhaust port 18, a spark plug 22 is provided such that the tip of the spark plug 22 protrudes toward a combustion chamber. The timing when to fire the spark plug 22 is controlled by an engine control device 1, which will be described later.

The upper ends of the intake valve 27 and the exhaust valve 28 are connected to rocker arms 35 and 37 in a variable valve actuating mechanism 40, respectively, and are independently reciprocated vertically, in response to respective swing motions of the rocker arms 35 and 37. To the other ends of the rocker arms 35 and 37, cams 36 and 38 pivoted by respective cam shafts are provided, respectively. The swing patterns of the rocker arms 35 and 37 are defined by the shapes (cam profiles) of the cams 36 and 38. Via the variable valve actuating mechanism 40, the valve lifts and valve timings of the intake valve 27 and the exhaust valve 28 are controlled by the engine control device 1.

[1-2. Fuel Injection System]

As injectors for supplying fuel to the cylinders 20, a cylinder injection valve (direct injection injector) 11 for injecting the fuel directly into the cylinder 20 and a port injection valve (port injection injector) 12 for injecting the fuel into the intake port 17, are provided. Two types of fuel infection are selected or combined, according to the operating states of the engine 10, to produce a homogeneous combustion to combust fuel-air mixture in a homogeneous concentration distribution inside the cylinder 20, and a stratified charge combustion to combust a fuel-air mixture in a high concentration, distributed ununiformly and forming a stratum in the vicinity of the spark plug 22.

The port injection is carried out primarily during the homogeneous combustion, whereas the cylinder injection is carried out primarily during the stratified charge combustion. Note that, however, while the fuel is being injected from the cylinder injection valve 11, it is possible to produce the homogeneous combustion. The homogeneous combustion produced by the cylinder injection often provides an increase in the volumetric efficiency since latent heat is absorbed when the fuel evaporates in the cylinder 20. The drop in the combustion temperature also helps to suppress knocks.

The fuel injected from the cylinder injection valve 11 is guided by a stratified air flow generated in the cylinder 20, for example, to the vicinity of the spark plug 22, and distributes heterogeneously in the intake air. The fuel injected from the port injection valve 12, on the other hand, is atomized inside the intake port 17, for example, and is introduced to the cylinder 20 after being mixed homogeneously with the intake air.

Those injection valves 11 and 12 of the two types are also provided to other cylinders (not shown) provided in the engine 10. The amounts of fuel to be injected from the cylinder injection valve 11 and the port injection valve 12, and the timings when the fuel is to be injected, are controlled by the engine control device 1. For example, in response to respective control pulse signals being transmitted from the engine control device 1 to the injection valves 11 and 12, respective injection ports of the injection valves 11 and 12 are opened for time durations corresponding to the control pulse signals. In this configuration, the amounts of fuel to be injected (injection fuel amounts) are controlled according to the magnitudes of the control pulse signals (driving pulse widths), and the time when the respective injections are to be initiated (injection start time) correspond to the time when the control pulse signals are transmitted.

The cylinder injection valve 11 is connected to a high-pressure pump 14A through a high-pressure fuel supply path 13A. The port injection valve 12 is connected to a low-pressure pump 14B through a low-pressure fuel supply path 13B. The fuel is supplied to the cylinder injection valve 11 with a pressure higher than the pressure of the fuel to the port injection valve 12. The high-pressure pump 14A and the low-pressure pump 14B are mechanical variable flow pumps for pumping the fuel. The pumps 14A and 14B operate with driving power supplied from the engine 10 or an electric motor, to discharge the fuel stored in a fuel tank 15 to the supply paths 13A and 13B, respectively. The respective amounts and pressures of the fuel discharged from the pumps 14A and 14B are controlled by the engine control device 1.

[1-3. Valve Mechanism System]

The engine 10 is provided with the variable valve actuating mechanism 40 that controls operations of the rocker arms 35 and 37, or the cams 36 and 38. The variable valve actuating mechanism 40 is a mechanism for changing respective maximum valve lifts and valve timings of the intake valve 27 and the exhaust valve 28, independently or cooperatively with each other. The variable valve actuating mechanism 40 is provided with a valve lift adjustment mechanism 41 and a valve timing adjustment mechanism 42, as mechanisms for varying the amplitudes and timings of swings by the rocker arms 35 and 37.

The valve lift adjustment mechanism 41 is a mechanism that continuously varies the maximum valve lifts of the intake valve 27 and the exhaust valve 28, and has a function to change the amplitudes of swings transmitted from the cams 36 and 38 to the rocker arms 35 and 37, respectively. The rocker arms 35 and 37 may have any structure for varying the amplitudes of the swings. A control parameter for a valve lift will be denoted as a control angle $\theta_{VVL}$. The valve lift adjustment mechanism 41 functions to increase the valve lift with an increase in the control angle $\theta_{VVL}$. The control angle $\theta_{VVL}$ is calculated by a valve control unit 5 in the engine control device 1, and is transmitted to the valve lift adjustment mechanism 41.

The valve timing adjustment mechanism 42 is a mechanism that varies timings (valve timings) for opening the intake valve 27 and closing the exhaust valve 28, and has a function to vary rotation phases of the cams 36 and 38 or the cam shafts, for swinging the rocker arms 35 and 37. By varying the rotation phases of the cams 36 and 38 or the cam shafts, the timings for swinging the rocker arms 35 and 37 can be shifted continuously relative to the rotation phase of the crank shaft 21.

A control parameter for valve timing will be denoted as a phase angle $\theta_{VVT}$. The phase angle $\theta_{VVT}$ indicates how much the phase of the cam 36 or 38 is advanced or retarded relative to the phase of the cam shaft as the reference, and corresponds to the opening time of the intake valve 27 or the closing time of the exhaust valve 28. The phase angle $\theta_{VVT}$ is calculated by the valve control unit 5 in the engine control device 1, and is transmitted to the valve timing adjustment mechanism 42. The valve timing adjustment mechanism 42 controls the respective valve timings to any timings by adjusting phase angles $\theta_{VVT}$ for the cams 36 and 38.

[1-4. Intake and Exhaust Systems]

The intake and exhaust systems of the engine 10 are provided with a turbocharger (supercharger) 30 that supercharges the intake into the cylinder 20, utilizing the exhaust pressure. The turbocharger 30 is provided across an intake path 24 connected upstream to the intake port 17, and an exhaust path 29 connected downstream to the exhaust port 18. A turbine 30A provided to the turbocharger 30 rotates, driven by the exhaust pressure inside the exhaust path 29, and transmits the resulting rotary torque to a compressor 30B in the intake path 24. Driven by the torque, the compressor 30B compresses the air inside the intake path 24 to feed the compressed air downstream, thereby providing supercharging for the cylinders 20. The supercharging by the turbocharger 30 is controlled by the engine control device 1.

An intercooler 39 is provided on the intake path 24 downstream to the compressor 30B, for cooling down the compressed air. An air filter 33 is provided upstream to the compressor 30B, for filtering the intake air taken in from the outside. Further, an intake bypass path 25 is provided so as to connect the intake paths 24 upstream to and the intake paths 24 downstream to the compressor 30B, and a bypass valve 26 is provided, interposing the intake bypass path 25. The amount of the air flowing through the intake bypass path 25 is adjusted according to the opening of the bypass valve 26. The bypass valve 26 is controlled to be open when the vehicle is decelerated abruptly, for example, and functions to purge the supercharging pressure provided from the compressor 30B back to the upstream side. Note that the opening of the bypass valve 26 is controlled by the engine control device 1.

A throttle body is connected downstream to the intercooler 39, downstream to which an intake manifold is connected. In the throttle body, an electrically controllable throttle valve 16 is provided. The amount of the air flowing to the intake manifold is adjusted according to the opening of the throttle valve 16 (throttle opening). The throttle opening is controlled by the engine control device 1.

The intake manifold is provided with a surge tank 23 for temporarily retaining the air flowing to each cylinder 20. The intake manifold downstream to the surge tank 23 is branched out toward the respective intake ports 17 of the cylinders 20, and the surge tank 23 is positioned at the branch point. The surge tank 23 functions to reduce intake pulsations and intake interferences that may arise in the cylinders 20.

A catalyst device 43 is provided, interposing the exhaust path 29 downstream to the turbine 30A. The catalyst device 43 has a function to eliminate, break down, and/or remove components, such as particulate matters (PMs), nitrogen oxides (NOx), carbon monoxide (CO), hydrocarbons (HCs), in the exhaust, for example. Upstream to the turbine 30A, an exhaust manifold is connected which branches out toward the respective exhaust ports 18 of the cylinders 20.

An exhaust bypass path 31 is provided so as to connect the exhaust path 29 upstream to and the exhaust path 29 downstream to the turbine 30A, and an electrically controllable waste gate valve 32 is provided, interposing the exhaust bypass path 31. The waste gate valve 32 is a supercharging pressure adjustment valve that adjusts the supercharging pressure by controlling the amount of the exhaust stream flowing toward the turbine 30A. The waste gate valve 32 is provided with an actuator 32b that electrically controls the position (i.e., the opening) of a valve body 32a. The operation of the actuator 32b is controlled by the engine control device 1.

[1-5. Detection Systems]

In the vicinity of the crank shaft 21, an engine rotation speed sensor 44 is provided which detects the rotation speed Ne (number of rotations per unit time) of the crank shaft 21. The vehicle is provided with an accelerator pedal position sensor 45 in any suitable position of the vehicle, which detects how much the accelerator pedal is being depressed (the accelerator opening $A_{PS}$). The accelerator opening $A_{PS}$ is a parameter indicative of a request by the driver to accelerate or start the vehicle, in other words, is the parameter that correlates with the load P on the engine 10 (output request for the engine 10).

In the intake path 24, an air flow sensor 46 is provided which detects the intake flow rate Q. The intake flow rate Q is a parameter indicative of the flow rate of the air that actually passes through the air filter 33. In the surge tank 23, an intake manifold pressure sensor 47 and an intake temperature sensor 48 are provided. The intake manifold pressure sensor 47 detects the pressure in the surge tank 23, which is used as an intake manifold pressure, and the intake temperature sensor 48 detects the intake temperature in the surge tank 23. The respective information detected by the sensors 44-48 is conveyed to the engine control device 1.

[1-6. Control System]

The vehicle having the above-described engine 10 installed therein, is provided with the engine control device 1. The engine control device 1 is configured as an LSI device or an embedded electronic device on which various components, such as a microprocessor, an ROM, and an RAM, are mounted, and the engine control device 1 is connected to a communication line for an in-vehicle network provided in the vehicle.

The engine control device 1 is an electronic control device that collectively controls a wide variety of systems related to the engine 10, e.g., the ignition system, the fuel system, the intake and exhaust systems, and the valve mechanism system, and controls various parameters, such as the amounts of the air and the amounts of the fuel to be supplied to the cylinders 20 in the engine 10, the ignition timings of the respective cylinders 20, and the supercharging pressure. The sensors 44-48 described above are connected to input ports of the engine control device 1. Information supplied to engine control device 1 includes the accelerator opening $A_{PS}$, the intake flow rate Q, the intake manifold pressure, the intake temperature, the engine rotation speed Ne, and the like.

The specific parameters controlled by the engine control device 1 include how much fuel is to be injected from the cylinder injection valve 11 and the port injection valve 12 and when to inject, the ignition timing by the spark plug 22, the valve lifts and valve timings of the intake valve 27 and the exhaust valve 28, the operating state of the turbocharger 30, the opening of the throttle valve 16, the opening of the bypass valve 26, the opening of the waste gate valve 32, and the like. Three types of controls employed in the present embodiment: an injection region control, a supercharging control, and a valve overlap period control, will be described.

[2. Overview of Controls]

[2-1. Injection Region Control]

In the injection region control, fuel injection types are switched according to the operating state of the engine 10 and the magnitude of an output requested to the engine 10. Specifically, on the basis of the engine rotation speed Ne, the engine load P, the amount of the air, the filling efficiency Ec (e.g., the target filling efficiency and the actual filling efficiency), the accelerator opening $A_{PS}$, and the like, for example, one of the following modes is selected: an "MPI mode" where only a port injection is carried out, a "DI mode" where only a cylinder injection is carried out, and a "DI+MPI mode" where fuel is injected combining a port injection and a cylinder injection.

Figure 3:
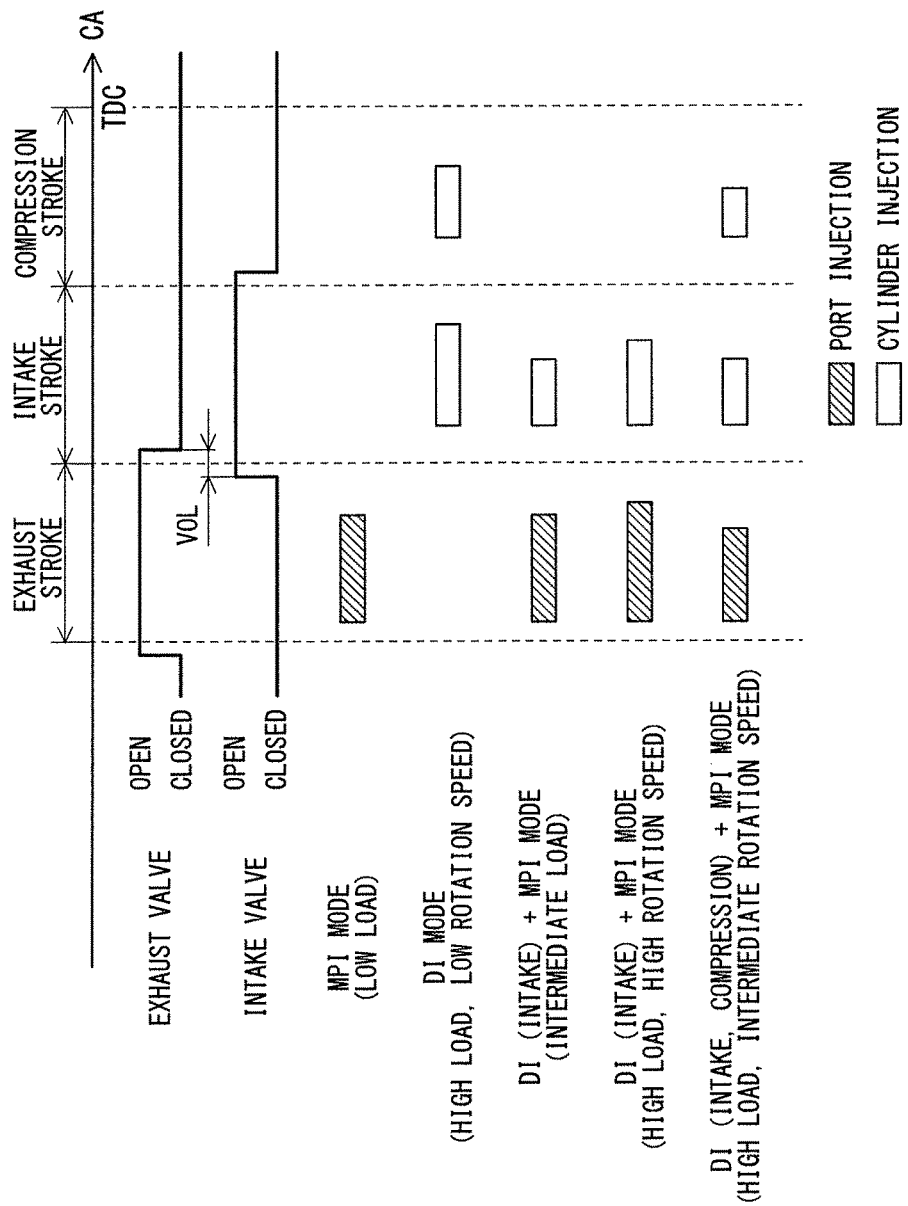
FIG. 3 is a schematic diagram illustrating the open and close timings of an exhaust valve and an intake valve, fuel injection modes selected according to the operating states of the engine, and fuel injection timings in those modes.

FIG. 3 is a schematic diagram illustrating the open and close timings of the exhaust valve 28 and the intake valve 27, fuel injection modes selected according to the operating states of the engine 10, and fuel injection timings in those modes. In the drawing, the hatched rectangles indicate durations during which the fuel is being injected from the port injection valve 12 (port injection timing), whereas the white rectangles indicate durations during which the fuel is being injected from the cylinder injection valve 11 (cylinder injection timing).

The MPI mode is an injection mode that is selected when the load on the engine 10 is low. In the MPI mode, a fuel injection from the cylinder injection valve 11 is prohibited, and the entire injection amount of fuel is injected from the port injection valve 12 for achieving a requested output. The timing (fuel injection timing) for injecting the fuel from the port injection valve 12 in the MPI mode is preset, and fuel is injected at the preset injection timing once the MPI mode is selected. In the drawing, the timing for injecting the fuel from the port injection valve 12 is set in an exhaust stroke.

Note that the fuel injection timing for a port injection is not limited to the exhaust stroke, and the fuel injection timing maybe set such that a fuel injection is initiated at a later stage of an expansion stroke prior to the exhaust stroke, or during an intake stroke. In the low load operating state, the advantage of enhanced vaporization by a port injection is made use of improving the homogeneity of the fuel-air mixture, thereby improving the exhaust performance. Hereinafter, the amount of fuel injected from the port injection valve 12 will be referred to as "the port injection amount $F_P$".

The DI mode is an injection mode that is selected when the load on the engine 10 is high and the rotation speed of the engine 10 is low. In the DI mode, a fuel injection from the port injection valve 12 is prohibited, and the fuel is injected from the cylinder injection valve 11 separately in two steps: during an intake stroke and during a compression stroke, for achieving a requested output. The respective timings for fuel injection from the cylinder injection valve 11 in the DI mode are preset for the intake stroke and the compression stroke, and fuel is injected at the preset injection timings once the DI mode is selected.

After a cylinder injection, the intake air and the combustion chamber are cooled down by the vaporization latent heat of the fuel. This phenomenon is known as the intake air cooling effect, and this effect advantageously acts against knocking, resulting in an increased compression ratio. Particularly, by injecting the fuel separately in two steps: during an intake stroke and during a compression stroke, it is possible to maximize the intake air cooling effect. A higher compression ratio increases the volumetric efficiency, resulting in a higher engine output and leading to an improved fuel consumption. Furthermore, a fuel injection during a compression stroke improves combustions and enhances the anti-knocking property.

In a low rotation speed, the phenomenon, known as blow-by, tends to take place during a valve overlap period, in which intake air (fuel-air mixture) from the intake port 17 directly enters the exhaust port 18. The blow-by permits the fuel supplied through the port injection valve 12 to flow to the exhaust path 29, through in the cylinder 20, causing a drop in the engine output caused by fuel shortage, as well as a reduction in the exhaust performance due to hydrocarbons flowing to the exhaust system. Blow-by tends to take place while intake air is being compressed by the turbocharger 30, particularly while the engine 10 is in a low rotation speed. Accordingly, blow-by is prevented by prohibiting a port injection when the load on the engine 10 is high and the engine 10 is at a low rotation speed. Hereinafter, the amount of fuel injected from the cylinder injection valve 11 will also be referred to as the "cylinder injection amount $F_D$".

The DI+MPI mode is an injection mode that is selected when the operating state of the engine 10 is not in the low load (i.e., when the MPI mode is not selected) and the operating state of the engine 10 is not in the high load and in the low rotation speed (i.e., when the DI mode is not selected). In the DI+MPI mode, for achieving a requested output, fuel is injected from the cylinder injection valve 11 and from the port injection valve 12, at a predetermined ratio R of the injection amounts. In other words, both the cylinder injection valve 11 and the port injection valve 12 are operated in a single combustion cycle, for carrying out both a cylinder injection and a port injection. This provides both the advantage of the cylinder injection and the advantage of the port injection.

The ratio R of the port injection amount $F_P$ to the cylinder injection amount $F_D$ ($=F_P/F_D$) is preset, and unless the ratio is changed by a ratio modification unit 3c (described later), the fuel is injected from the cylinder injection valve 11 and from the port injection valve 12 at this ratio R in the DI+MPI mode. The ratio R of the port injection amount $F_P$ to the cylinder injection amount $F_D$ is set to a value of $0<R\leq1$. In other words, more fuel is injected from the cylinder injection valve 11 than from the port injection valve 12. In place of the ratio R, the ratio R1 ($=F_D/F_T$) of the cylinder injection amount $F_D$ to the total amount of the fuel to be injected in a single combustion cycle (the total fuel amount $F_T$, described later), and the ratio R2 ($=F_P/F_T$) of the port injection amount $F_P$ to the total fuel amount $F_T$, may be preset. In this case, R1 and R2 will satisfy the following: $R1 \geq R2$ and $R=R1+R2$.

Further, there are two types of the DI+MPI mode, depending on the operating state of the engine 10: a first DI+MPI mode (hereinafter, referred to as the "DI (intake)+MPI mode") where fuel is injected from the cylinder injection valve 11 during an intake stroke only; and a second DI+MPI mode (hereinafter, referred to as the "DI (intake, compression)+MPI mode") where the fuel is injected from the cylinder injection valve 11 separately in two steps: during an intake stroke and during a compression stroke. The DI (intake)+MPI mode is selected when the operating state of the engine 10 is in the intermediate load, or in the high load and the high rotating speed. The DI (intake, compression)+MPI mode is selected when the operating state of the engine 10 is in the high load and the intermediate rotating speed.

In the intermediate load operating state where the DI (intake)+MPI mode is selected, the total fuel injection amount $F_T$ is smaller than that in the high load because of a smaller requested output than in the high load. A cylinder injection during a compression stroke may induce smoke. Therefore, in the intermediate load operating state, limiting a cylinder injection only during an intake stroke prevents smoke, while satisfying the requested output.

When the operating state is in the high load and high rotation speed state where the DI (intake)+MPI mode is selected, by limiting the timing of a cylinder injection to an intake stroke, smoke is prevented while ensuring sufficient time for vaporization of the fuel injected from the cylinder injection valve 11. The timing for a fuel injection through the cylinder injection valve 11 during an intake stroke and the timing for a fuel injection through the port injection valve 12, in the DI (intake)+MPI mode, are preset. Thus, once the DI (intake)+MPI mode is selected, the fuel is injected at the preset injection timings.

When the operating state is in the high load and intermediate rotation speed mode where the DI (intake, compression)+MPI mode is selected, by carrying out a cylinder injection separately in two steps: during an intake stroke and during a compression stroke, the intake air cooling effect is maximized while improving combustions. An additional port injection during an exhaust stroke, for example, increases the amount of the premix, resulting in an improved exhaust performance. Since the three-step fuel injection reduces fuel injection amounts at respective strokes as compared to the fuel injection amounts in the other operating states, blow-by and smoke are suppressed. In the DI (intake, compression)+MPI mode, the timings for fuel injections through the cylinder injection valve 11 during intake and compression strokes, and the timing for a fuel injection through the port injection valve 12, are preset. Thus, once the DI (intake, compression)+MPI mode is selected, the fuel is injected at the preset injection timings.

When the DI (intake, compression)+MPI mode is selected, the cylinder injection amount $F_D$ is divided into the amount of fuel $F_{DI}$ to be injected during an intake stroke (hereinafter, referred to as the "intake injection amount $F_{DI}$"), and the amount of fuel $F_{DC}$ to be injected during a compression stroke (hereinafter, referred to as the "compression injection amount $F_{DC}$"), for injecting the fuel in each stroke. The ratio W of the compression injection amount $F_{DC}$ to the intake injection amount $F_{DI}$ ($=F_{DC}/F_{DI}$) is preset, and the cylinder injection amount $F_D$ is divided at this ratio W in the DI (intake, compression)+MPI mode.

The ratio W of the compression injection amount $F_{DC}$ to the intake injection amount $F_{DI}$ is set to a value of $0<W<1$. In other words, more fuel is injected from the cylinder injection valve 11 during an intake stroke than during a compression stroke, and the rest of the fuel is injected during a compression stroke. In place of ratio W, the ratio W1 ($=F_{DI}/F_D$) of the intake injection amount $F_{DI}$ to the cylinder injection amount $F_D$ ($=F_{DI}/F_D$), and the ratio W2 ($=F_{DC}/F_D$) of the compression injection amount $F_{DC}$ to the cylinder injection amount $F_D$, may be preset. In this case, W1 and W2 will satisfy the following: W1>W2 and W=W1+W2.

[2-2. Supercharging Control]

A supercharging control is a control for determining the operating state of the turbocharger 30 (e.g., whether the turbocharger 30 is activated or not, or the magnitude of the action by the turbocharger 30), depending on the operating state of the engine 10 and the magnitude of an output requested to the engine 10. Specifically, a supercharging control is carried out by controlling the opening of the waste gate valve 32, on the basis of various parameters, such as the engine rotation speed Ne, the load P on the engine 10, the amount of the air, the filling efficiency Ec (e.g., the target filling efficiency and the actual filling efficiency), and the accelerator opening $A_{PS}$, for example.

In a typical supercharging control, when the load requested to the engine 10 is greater than the predetermined load $P_S$, the waste gate valve 32 is closed and the turbocharger 30 is activated. As a result, the supercharging increases the amount of intake air introduced to the cylinder 20, resulting in an increased engine output. In contrast, when the load requested to the engine 10 is equal to or less than the predetermined load $P_S$, the waste gate valve 32 is opened to allow passage of the exhaust air through the exhaust bypass path 31. As a result, the exhaust turbine output from the turbocharger 30 is reduced, or the turbocharger 30 is deactivated.

[2-3. Valve Overlap Period Control]

A valve overlap period control is a control for determining an optimal valve overlap period, for improving the volumetric efficiency of intake air and the engine output and for addressing the blow-by of a fuel-air mixture. A valve overlap period is an overlapped of a period during which the intake valve 27 is open and a period during which the exhaust valve 28 is open. A longer valve overlap period enhances the scavenging effect and increases the volumetric efficiency of intake air, leading to an improved engine output. During the valve overlap period, however, both the intake valve 27 and the exhaust valve 28 are open, blow-by of a fuel-air mixture containing fuel injected from the port injection valve 12 tends to take place. Particularly when the supercharging control activates the turbocharger 30, blow-by may take place frequently.

The valve overlap period is set, depending on the operating state of the engine 10 and the magnitude of an output requested to the engine 10, for example. In this embodiment, the valve overlap period is provided at least when the engine 10 is in the high load operating state. Two settings are used for the valve overlap period in the present embodiment.

Firstly, when the engine 10 is in the high load operating state and the DI+MPI mode has been selected in the injection region control, a "normal valve overlap period" is set using any of well-known techniques, for example. Otherwise, when the DI mode has been selected in the injection region control (i.e., in the high load and low rotation speed region), the valve overlap period is extended from the "normal valve overlap period".

This is for maximizing the scavenging effect, since there is no need to address any blow-by of a fuel-air mixture containing fuel injected through the port injection valve 12 in the DI mode. The variable valve actuating mechanism 40 is controlled such that the set or changed valve overlap period is provided. When the engine 10 is in the low or intermediate load opening states, the valve overlap period is set to 0 (or any preset predetermined value), for example, and the variable valve actuating mechanism 40 is controlled accordingly.

[3. Control Configuration]

Figure 2:
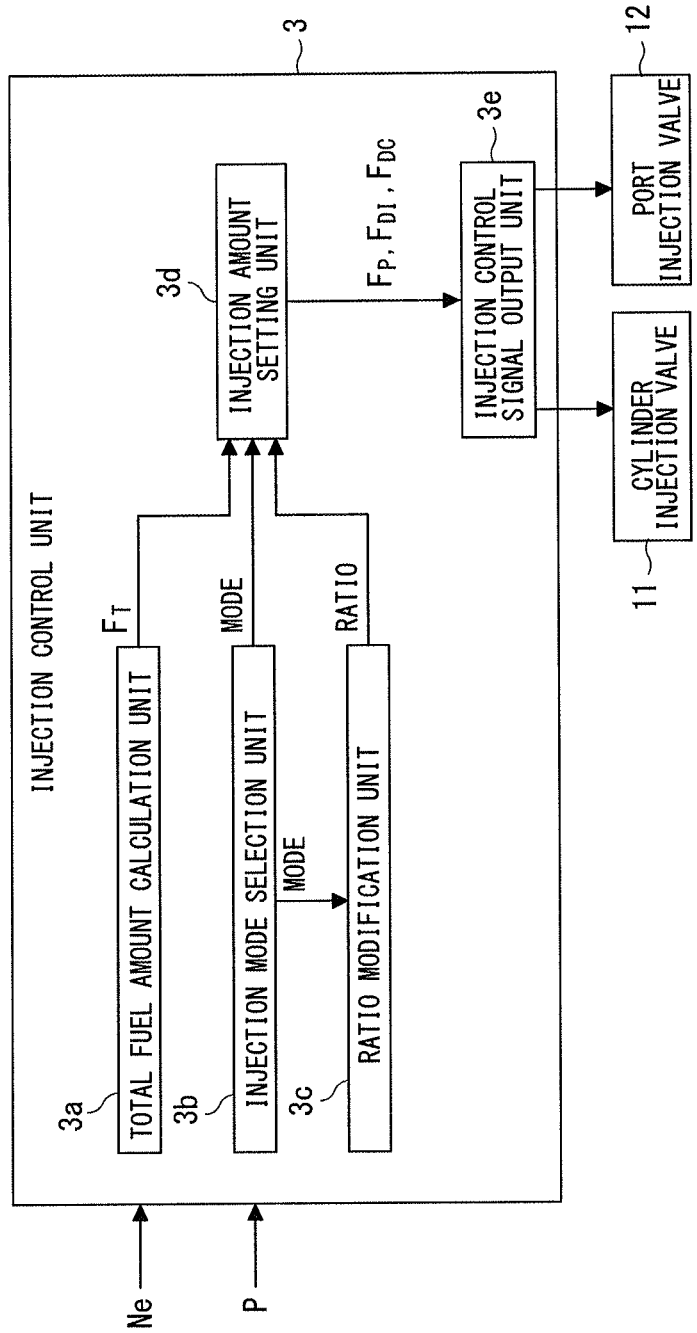
FIG. 2 is a diagram exemplifying a block configuration of an injection region control unit in the control device in FIG. 1.

Referring to FIG. 1, the engine control device 1 is provided with an engine load calculation unit 2, an injection control unit 3, a supercharging control unit 4, and a valve control unit 5, as elements for achieving the controls described above. The valve control unit 5 is provided with the valve overlap modification unit 5a. Referring also to FIG. 2, the injection control unit 3 is provided with a total fuel amount calculation unit 3a, an injection mode selection unit 3b, a ratio modification unit 3c, an injection amount setting unit 3d, and an injection control signal output unit 3e. These elements may be embodied by electronic circuits (hardware), or may be programmed as software, or part of the functions may be provided in hardware and the rest may be provided in software.

[3-1. Engine Load Calculation Unit]

The engine load calculation unit 2 is adapted to calculate the magnitude of the load P on the engine 10. As used therein, the term "load P" represents the force, power (engine output, horsepower), work (energy), and the like, which imposes resistance on the engine 10. Typically, an engine output requested to the engine 10 or any other parameters correlated thereto, are handled as the load P.

The load P is calculated on the basis of the amount of air introduced to the cylinders 20, for example, or is calculated on the basis of the flow rate of intake air or the flow rate of exhaust air, or the like. The load P may be calculated on the basis of any other parameters, such as the intake pressure, the exhaust pressure, the vehicle speed V, the rotation speed Ne, the accelerator opening $A_{PS}$, an operating state of an external load device, or the like. In the present embodiment, the magnitude of the load P is calculated on the basis of the filling efficiency Ec or the volumetric efficiency Ev, which are calculated on the basis of the intake flow rate Q and the rotation speed Ne. The value of the load P calculated in this unit is transmitted to the injection control unit 3, the supercharging control unit 4, and the valve control unit 5.

[3-2. Injection Region Control Unit]

The injection control unit (injection controller) 3 is adapted to carry out an injection region control by controlling a fuel injection through the cylinder injection valve 11 and a fuel injection through the port injection valve 12.

The total fuel amount calculation unit 3a is adapted to calculate the amount of fuel to be injected for achieving a requested output in a single combustion cycle, as the total fuel amount $F_T$, on the basis of the rotation speed Ne of the engine 10 and the load P calculated by the engine load calculation unit 2. For example, a fuel injection amount map including the load P on the engine 10 and the rotation speed Ne, as arguments, is stored in the injection control unit 3, in advance, and the total amount of fuel to be injected (i.e., the total fuel amount $F_T$) is calculated using this map. The total fuel amount $F_T$ calculated in this unit is transmitted to the injection amount setting unit 3d.

The injection mode selection unit 3b is adapted to select one of the above-described fuel injection modes: the MPI mode, the DI mode, and the DI+MPI mode, on the basis of the operating state of the engine 10. The injection control unit 3 stores a map that defines relationships between operating states of the engine 10 and the fuel injection modes, calculation formulae, or the like. One fuel injection mode is selected on the basis of such a map, calculation formulae, or the like.

Figure 4:
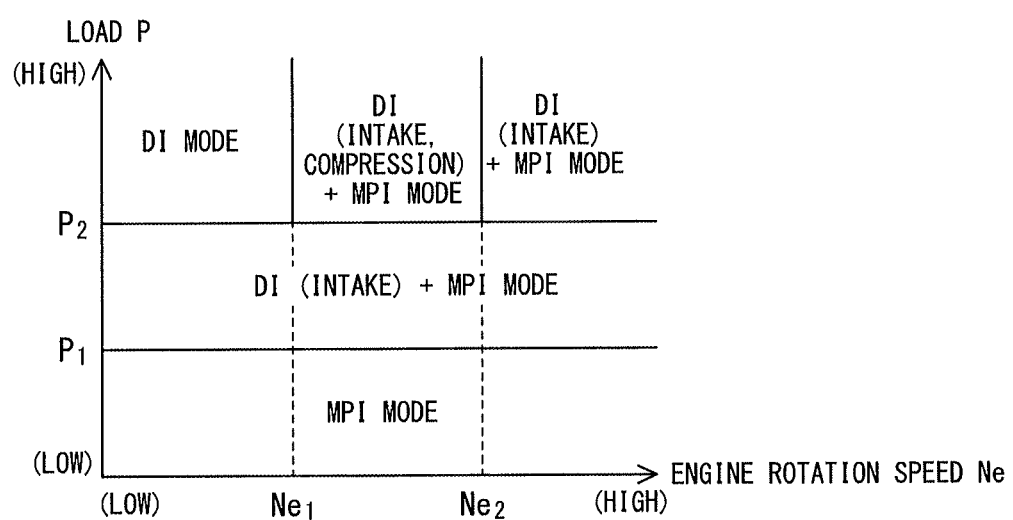
FIG. 4 is a map for selecting fuel injection modes in accordance with this control device.

In the present embodiment, an injection mode map as shown in FIG. 4 is stored in the injection control unit 3, in advance. In this injection mode map, the fuel injection modes are specified on a coordinate plane defined by the load P as the vertical axis and the rotation speed Ne as the horizontal axis. Specifically, in the low load operating state where the load P is less than a predetermined first load $P_1$, the MPI mode region is specified. Here, the first load $P_1$ is a preset constant, and is approximately equal to or smaller than the predetermined load $P_S$ that is the threshold for determining whether or not supercharging by the turbocharger 30 is activated. In other words, in the MPI mode region, supercharging by the turbocharger 30 is not activated.

In the intermediate load operating state where the load P is equal to or greater than the first load $P_1$ and less than a predetermined second load $P_2$, the DI (intake)+MPI mode region is specified. Here, the second load $P_2$ is a preset constant, and is greater than the first load $P_1$ and is approximately 80% of the total load.

In the high load operating state where the load P is equal to or greater than the second load $P_2$, the following three regions: the DI mode region, the DI (intake, compression)+MPI mode region, and the DI (intake)+MPI mode region, are specified in the ascending order of the rotation speed Ne. For the sake of the brevity of description, the region where the rotation speed Ne is less than a first rotation speed $Ne_1$, is referred to as the DI mode region. The region where the rotation speed Ne is equal to or greater than the first rotation speed $Ne_1$ and less than a second rotation speed $Ne_2$ is referred to as the DI (intake, compression)+MPI mode region. The region where the rotation speed Ne is equal to or greater than the second rotation speed $Ne_2$ is referred to as the DI (intake)+MPI mode region. Here, the first rotation speed $Ne_1$ is a preset constant greater than zero, and is a value equivalent to or greater than the idle rotation speed, for example. The second rotation speed $Ne_2$ is also a preset constant, and is greater than the first rotation speed $Ne_1$.

The MPI mode region, the DI mode region, the DI (intake)+MPI mode region, and the DI (intake, compression)+MPI mode region, are the regions where the MPI mode, the DI mode, the DI (intake)+MPI mode, the DI (intake, compression)+MPI mode, are selected, respectively. By applying the rotation speed Ne and the load P to the injection mode map in FIG. 4, the injection mode selection unit 3b selects one fuel injection mode. The selected fuel injection mode is transmitted to the ratio modification unit 3c and the injection amount setting unit 3d, as well as to the valve control unit 5.

The ratio modification unit 3c is adapted to change the ratio R of the port injection amount $F_P$ to the cylinder injection amount $F_D$, according to the rotation speed Ne of the engine 10, when the load P is in the high load operating state of the second load $P_2$ or greater and the fuel injection mode is the DI+the MPI mode. As indicated by the solid line in FIG. 5(a), the ratio modification unit 3c increases the ratio R with an increase in the rotation speed Ne, and decreases the ratio R with a decrease in the rotation speed Ne.

Stated differently, the ratio modification unit 3c gradually decreases the ratio R1 of the cylinder injection amount $F_D$ to the total fuel amount $F_T$ (indicated by the dashed line in the drawing), and gradually increases the ratio R2 of the port injection amount $F_P$ to the total fuel amount $F_T$ (indicated by the chain double-dashed line in the drawing), as the rotation speed Ne increases relative to the first rotation speed $Ne_1$. Such a control is for satisfying a requested output at high rotation speeds Ne where the amount of fuel that can be injected into the cylinder 20 in a single combustion cycle (i.e., the cylinder injection amount $F_D$) is limited. At low rotation speeds Ne, on the other hand, this is made for suppressing blow-by that may take place during a valve overlap period.

Figure 5A:
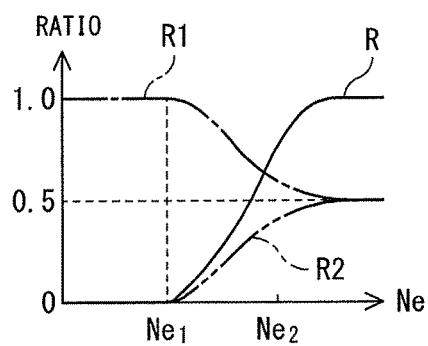
FIG. 5(*a*) is a graph showing the engine rotation speed versus the ratio of fuel injection in the high load operating state, and (*b*) is a graph showing the relationship between the ratio of the port injection amount to cylinder injection amount, and the torque.
Figure 5B:
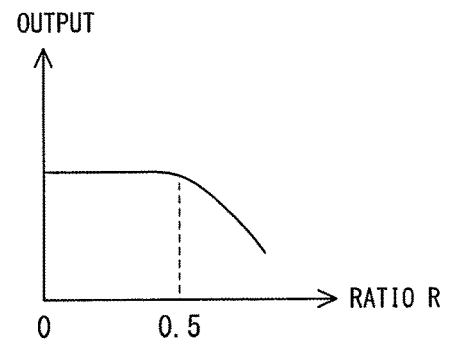

In this control, as indicated by the solid line in FIG. 5(a), the ratio modification unit 3c limits the ratio R of the port injection amount $F_P$ to the cylinder injection amount $F_D$ to 1 at maximum. In other words, as indicated by the dashed line and the double-dashed line in the drawing, at high rotation speeds, the ratio R1 of the cylinder injection amount $F_D$ to the total fuel amount $F_T$ is set to be equal to the ratio R2 of the port injection amount $F_P$ to the total fuel amount $F_T$. This is because, as shown in FIG. 5(b), when the ratio R of the port injection amount $F_P$ to the cylinder injection amount $F_D$ reaches 0.5 or greater, the intake air cooling effect through the cylinder injection sharply diminishes for the same total fuel amount $F_T$, and the output becomes extremely low. When the ratio R is changed by the ratio modification unit 3c, the changed ratio R is transmitted to the injection amount setting unit 3d.

The injection amount setting unit 3d is adapted to set the cylinder injection amount $F_D$ from the cylinder injection valve 11 (the intake injection amount $F_{DI}$ and the compression injection amount $F_{DC}$) and the port injection amount $F_P$ from the port injection valve 12, according to the fuel injection mode selected by the injection mode selection unit 3b. Specifically, the injection amount setting unit 3d sets the values, using the total fuel amount $F_T$ calculated by the total fuel amount calculation unit 3a, the ratio R and the ratio W that are preset, and the ratio R changed by the ratio modification unit 3c. The intake injection amount $F_{DI}$, the compression injection amount $F_{DC}$, and the port injection amount $F_P$ that are set in this unit above, are transmitted to the injection control signal output unit 3f.

Since only the port injection valve 12 is used while the MPI mode is selected, the injection amount setting unit 3d assigns 0 to the cylinder injection amount $F_D$, and assigns the value of the total fuel amount $F_T$ to the port injection amount $F_P$.

Since only the cylinder injection valve 11 is used while the DI mode is selected, the injection amount setting unit 3d assigns 0 to the port injection amount $F_P$, and sets the injection amounts $F_{DI}$ and $F_{DC}$, by dividing the total fuel amount $F_T$, into the intake injection amount $F_{DI}$ and the compression injection amount $F_{DC}$, respectively, on the basis of the preset ratio W.

When the DI (intake)+MPI mode is selected in the intermediate load operating state, the injection amount setting unit 3d sets the port injection amount $F_P$, by dividing the total fuel amount $F_T$ into the cylinder injection amount $F_D$ and the port injection amount $F_P$, on the basis of the preset ratio R. It further assigns the cylinder injection amount $F_D$ to the intake injection amount $F_{DI}$, and assigns 0 to the compression injection amount $F_{DC}$.

When the DI (intake)+MPI mode is selected in the high load operating state, the injection amount setting unit 3d sets the port injection amount $F_P$, by dividing the total fuel amount $F_T$ to the cylinder injection amount $F_D$ and the port injection amount $F_P$, on the basis of the ratio R changed by the ratio modification unit 3c. It further sets the cylinder injection amount $F_D$ to the intake injection amount $F_{DI}$, and assigns 0 to the compression injection amount $F_{DC}$.

When the DI (intake, compression)+MPI mode is selected in the high load operating state, the injection amount setting unit 3d sets the port injection amount $F_P$, by dividing the total fuel amount $F_T$ into the cylinder injection amount $F_D$ and the port injection amount $F_P$, on the basis of the ratio R changed by the ratio modification unit 3c. It further sets the injection amounts $F_{DI}$ and $F_{DC}$ by dividing the cylinder injection amount $F_D$ into the intake injection amount $F_{DI}$ and the compression injection amount $F_{DC}$, respectively, on the basis of the preset ratio W.

The injection control signal output unit 3e is adapted to output control signals to the cylinder injection valve 11 and the port injection valve 12, such that the fuel injection amounts set by the injection amount setting unit 3d are provided according to the fuel injection mode selected by the injection mode selection unit 3b. In response to those control signals, the cylinder injection valve 11 and the port injection valve 12 are operated at the time and in durations corresponding to the control signals. As a result, the desired cylinder injection amount $F_D$ (the intake injection amount $F_{DI}$ and the compression injection amount $F_{DC}$) and the desired port injection amount $F_P$ are provided. Note that the timings for fuel injection from the cylinder injection valve 11 and the port injection valve 12 can be arbitrarily set.

[3-3. Supercharging Control Unit]

The supercharging control unit 4 is adapted to carry out the above-described supercharging control. Specifically, the supercharging control unit 4 determines that supercharging is required if the load P requested to the engine 10 is greater than a predetermined load $P_S$, and controls the actuator 32b to close the waste gate valve 32. As a result, the turbocharger 30 is activated (ON state), and supercharging increases the amount of intake air introduced to in the cylinder 20.

Otherwise, the supercharging control unit 4 determines that no supercharging is required if the load P requested to the engine 10 is equal to or less than the predetermined load $P_S$, and control the actuator 32b to open the waste gate valve 32. This allows passage of the exhaust air through the exhaust bypass path 31, and thus reduces the exhaust turbine output from the turbocharger 30 or deactivates the turbocharger 30 (OFF state).

The condition for determining whether supercharging is to be activated or not is not limited to the comparison of the requested load P with the predetermined load $P_S$. For example, a separate condition that is different from that for selecting a fuel injection mode may be employed, or a condition may be specified as predetermined regions on the map shown in FIG. 4. In addition to the open/close control, the opening of the waste gate valve 32 may also be controlled.

[3-4. Valve Control Unit]

The valve control unit 5 is adapted to carry out the above-described valve overlap period control by controlling operations of the variable valve actuating mechanism 40. The valve control unit 5 sets the valve overlap period, according to the operating state of the engine 10 (e.g., the rotation speed Ne and/or the load P) and/or the magnitude of an output requested to the engine 10. In this embodiment, the valve overlap period is provided at least when the engine 10 in the high load operating state.

The valve overlap modification unit 5a is adapted to extend the valve overlap period that has been set (i.e., the normal valve overlap period), when the DI mode is selected by the injection mode selection unit 3b. How long the valve overlap period is extended may be determined, on the basis of the engine rotation speed Ne and/or the load P, for example, or may be a constant.

The valve control unit 5 sets respective control angle $\theta_{VVL}$ and phase angle $\theta_{VVT}$ for the intake valve 27 and the exhaust valve 28 such that the valve overlap period that has been set or changed, is provided. The valve control unit 5 then transmits the information of the control angles $\theta_{VVL}$ and the phase angles $\theta_{VVT}$, to the valve lift adjustment mechanism 41 and the valve timing adjustment mechanism 42 in the variable valve actuating mechanism 40, for providing the optimal valve overlap periods.

[4. Flowcharts]

Figure 6:
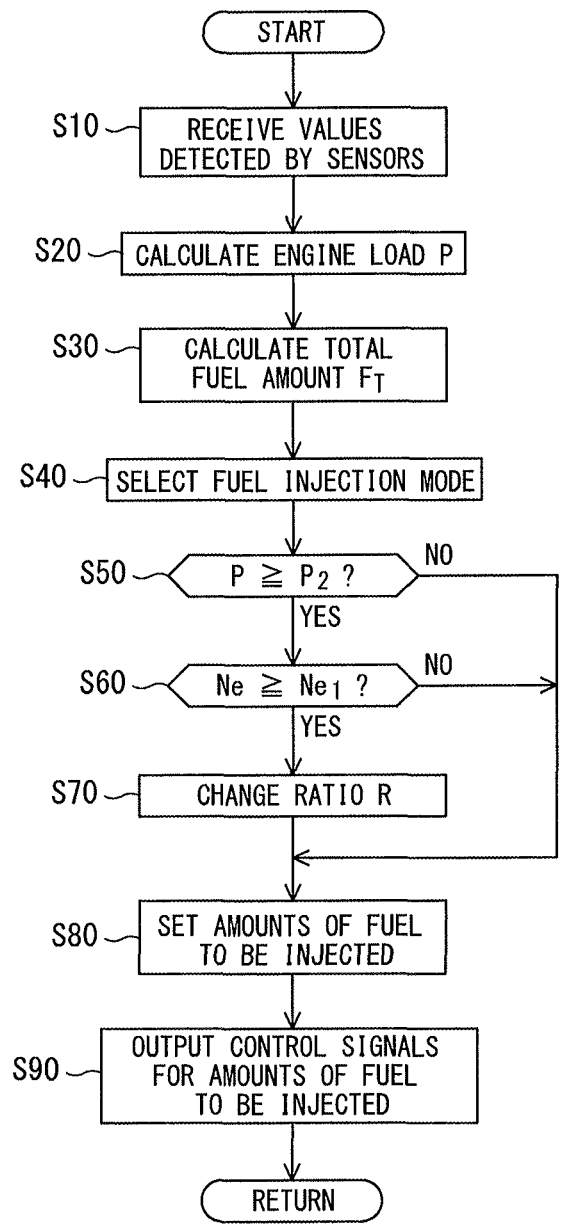
FIG. 6 is a flowchart exemplifying a control procedure of an injection region control in the engine control device.
Figure 7:
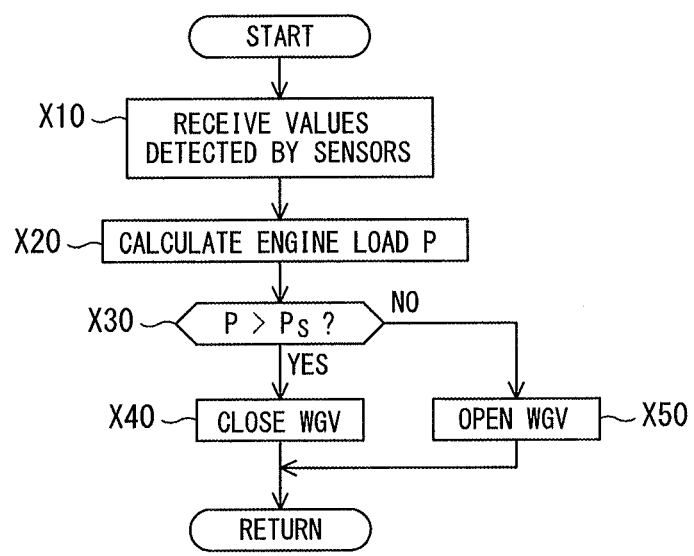
FIG. 7 is a flowchart exemplifying a control procedure of a supercharging control in the engine control device.
Figure 8:
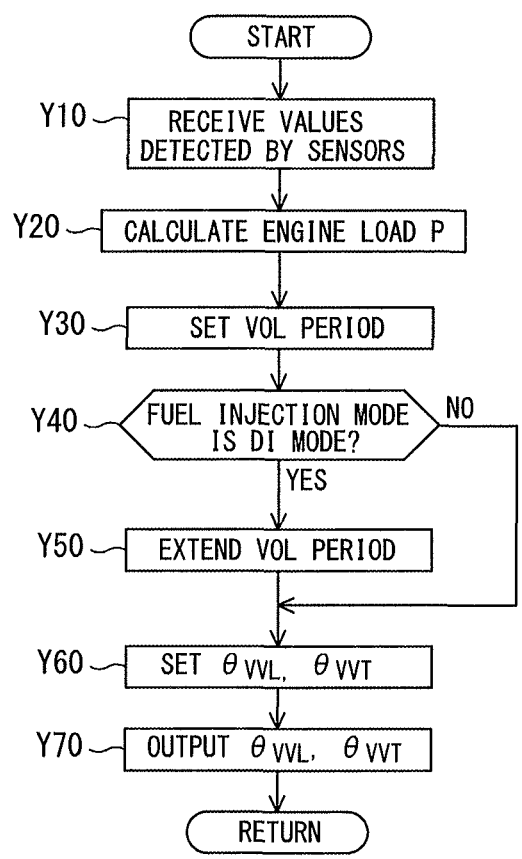
FIG. 8 is a flowchart exemplifying a control procedure of a valve overlap period control in the engine control device.

FIGS. 6 to 8 are flowcharts for describing procedures of the injection region control, the supercharging control, and the valve overlap period control. These flows are executed in the engine control device 1 repeatedly at predetermined computation cycles.

Firstly, the injection region control will be described. Referring to in FIG. 6, in Step S10, various types of information detected by the sensors 44-48 are entered to the engine control device 1. In Step S20, the load P on the engine 10 is calculated on the basis of the intake flow rate Q, the rotation speed Ne, or the like, in the engine load calculation unit 2. In following Step S30, a total fuel amount $F_T$ is calculated in the total fuel amount calculation unit 3a.

In Step S40, one of the fuel injection modes is selected on the basis of the operating state of the engine 10 in the injection mode selection unit 3b. Upon selecting a fuel injection mode, it is determined in which region the rotation speed Ne and the load P of the present time fall within the map as shown in FIG. 4, for example. In Step S50, it is determined whether or not the load P is equal to or greater than the second load $P_2$. If the load P is high of being equal to or greater than the second load $P_2$, the flow proceeds to Step S60, wherein it is determined whether or not the rotation speed Ne is equal to or greater than the first rotation speed $Ne_1$.

If the rotation speed Ne is equal to or greater than the first rotation speed $Ne_1$, the operating state is in the high load and intermediate or higher rotation speed state and the flow proceeds to Step S70. In Step S70, the preset ratio R is changed according to the rotation speed Ne in the ratio modification unit 3c, and the flow proceeds to Step S80. Upon changing the ratio R, the rotation speed Ne of the present time is applied to the graph as shown in FIG. 5(a), for example. Otherwise, if either one of the determinations in Step S50 or in Step S60 does not hold true, the flow proceeds to Step S80.

In Step S80, the intake injection amount $F_{DI}$ and the compression injection amount $F_{DC}$ to be injected from the cylinder injection valve 11 are set and the port injection amount $F_P$ to be injected from the port injection valve 12 is set, according to the fuel injection mode, in the injection amount setting unit 3d. Then in Step S90, control signals are output to the cylinder injection valve 11 and the port injection valve 12 in the injection control signal output unit 3e, such that it is ensured that the fuel is injected in the amounts of fuel injections set in Step S80.

Next, the supercharging control will be described. As shown in FIG. 7, in Step X10, various types of information detected by the sensors 44-48 are entered to the engine control device 1. In Step X20, the load P on the engine 10 is calculated in the engine load calculation unit 2, on the basis of the intake flow rate Q, the rotation speed Ne, or the like. In following Step X30, it is determined in the supercharging control unit 4 whether or not the load P is greater than the predetermined load $P_S$.

If the load P is greater than the predetermined load $P_S$, in Step X40, the waste gate valve 32 (WGV) is closed and the turbocharger 30 is activated. Otherwise, the load P is equal to or less than the predetermined load $P_S$, in Step X50, the waste gate valve 32 (WGV) is opened and the turbocharger 30 is deactivated.

Finally, the valve overlap period control will be described. As shown in FIG. 8, in Step Y10, various types of information detected by the sensors 44-48 are entered to the engine control device 1. In Step Y20, the load P on the engine 10 is calculated in the engine load calculation unit 2, on the basis of the intake flow rate Q, the rotation speed Ne, or the like. In following Step Y30, the valve overlap period (VOL) is set in the valve control unit 5.

In Step Y40, it is determined whether or not the fuel injection mode selected in Step S40 in FIG. 6 is the DI mode. If the mode is the DI mode, the flow proceeds to Step Y50 wherein the valve overlap period set in Step Y30 is extended and the flow proceeds to Step Y60. Otherwise, if the mode is not the DI mode, the flow proceeds to Step Y60. In Step Y60, the control angle $\theta_{VVL}$ and the phase angle $\theta_{VVT}$ for each of the intake valve 27 and the exhaust valve 28 are set, according to the valve overlap period that has been set or changed. Then in Step Y70, information of the control angles $\theta_{VVL}$ and the phase angles $\theta_{VVT}$ is output.

[5. Advantages and Effects]

(1) In the above-described engine control device 1, since a port injection is carried out in the low load operating state, the advantage of enhanced vaporization is made use of improving the homogeneity of the fuel-air mixture, thereby improving the exhaust performance by reducing hydrocarbons. Additionally, since no fuel injection through the cylinder injection valve 11 is carried out in this state, carbon (C) deposition inside the cylinders 20 can be reduced. Furthermore, pumping of the fuel by the high-pressure pump 14A for cylinder injections is suspended when only a port injection is carried out, which can reduce friction.

Furthermore, since a cylinder injection is carried out during an intake stroke in the intermediate load operating state, the resultant intake air cooling effect helps to suppress knocks, thereby increasing the compression ratio. The volumetric efficiency is thus improved, thereby achieving an enhanced engine output. Additionally, since a port injection is also carried out in this state, fuel-air mixture with an improved homogeneity can be supplied, which improves the exhaust performance.

Furthermore, since a fuel injection through the cylinder injection valve 11 is carried out during an intake stroke and during a compression stroke in the high load operating state, the intake air cooling effect is maximized while improving combustions.

Accordingly, in the above-described engine control device 1, it is possible to make the most use of the advantage of the cylinder injection (i.e., provision of a higher output with the intake air cooling effect) and the advantage of the port injection (i.e., an improved exhaust performance), enabling both provision of a higher output and provision of an excellent exhaust performance.

(2) In the above-described engine control device 1, in the high load operating state, the ratio of the port injection amount $F_P$ is increased with an increase in the rotation speed Ne, whereas the ratio of the port injection amount $F_P$ is decreased with a reduction in the rotation speed Ne. In other words, in the high load operating state, the ratio between the cylinder injection amount $F_D$ and the port injection amount $F_P$ is changed according to the rotation speed Ne.

Generally, the supercharging pressure tends to be increased for achieving a higher output in a high load operating state, which may disadvantageously increase blow-by during a valve overlap period, resulting in possible reductions in the output and the exhaust performance. An alternative solution by reducing a valve overlap period may not provide a favorable scavenging effect. This may result in a reduced volumetric efficiency, and a required output may not be provided. Increasing the engine rotation speed Ne shortens the time that can be used for a fuel injection through cylinder injection valve 11, and accordingly the amount of fuel injected may be limited.

In contrast, in the above-described engine control device 1, a higher ratio of the port injection amount $F_P$ is increased in the high load and high rotation speed state, which ensures that a requested output is satisfied, as well as suppressing smoke that may be induced by a cylinder injection. Additionally, by reducing a ratio of the port injection amount $F_P$ in the high load and low rotation speed state, blow-by during the valve overlap period can be suppressed.

(3) The intake air cooling effect of the cylinder injection sharply diminished when the ratio R of the port injection amount $F_P$ to the cylinder injection amount $F_D$ exceeded 1. In the above-described engine control device 1, in contrast, the ratio R of the port injection amount $F_P$ to the cylinder injection amount $F_D$ is kept to 1 or less (1 at maximum) in the high load operating state. Thus, the intake air cooling effect of the cylinder injection is maintained, and the advantage of the cylinder injection can be ensured.

(4) Further, in the above-described engine control device 1, since the port injection amount $F_P$ is set to 0 when the engine 10 is in the high load and low rotation speed state, blow-by during a valve overlap period can be suppressed, which prevents reductions in the output and the exhaust performance.

(5) In the above-described engine control device 1, provision of a valve overlap period in at least the high load operating state provides a scavenging effect, thereby improving the volumetric efficiency. The combination with the turbocharger 30 further enhances the improvements in the scavenging effect and the volumetric efficiency. Note that extending the valve overlap period in the high load and low rotation speed state in the above-described engine control device 1 further enhances the scavenging effect and thus improves the volumetric efficiency.

(6) In the above-described engine control device 1, when the engine is in the high load and high rotation speed state, a port injection is carried out and a cylinder injection is also carried out only during an intake stroke. Accordingly, smoke is prevented, while satisfying the requested output.

[6. Modifications]

While the embodiment has been described above, the embodiment may be practiced in a wide variety of modifications, in an extent not departing from the purposes thereof. The elements in the present embodiment may be omitted or selected, if required, or may be suitably combined.

The above-described fuel injection modes described in the embodiment are merely exemplary, and are not limited to those in the map shown in FIG. 4. For example, while the DI mode is selected only at a low rotation speed in the high load operating state in the above-described embodiment, the DI+MPI mode may be used in the similar manner as other rotation speed states. In this case, preferably, the ratio R of the port injection amount $F_P$ to the cylinder injection amount $F_D$ is increased with an increase in the rotation speed Ne, whereas the ratio R is decreased with a reduction in the rotation speed Ne. Additionally, rather than providing the separate DI+MPI modes, a cylinder injection may be carried out only during an intake stroke or may be carried out separately during an intake stroke and during a compression stroke.

Additionally, while the ratio R of the port injection amount $F_P$ to the cylinder injection amount $F_D$ is changed when the DI+MPI mode is selected in the high load operating state in the above-described embodiment, the ratio of the port injection amount $F_P$ may be changed according to the rotation speed Ne as long as the operating state is in the high load, irrespective of which mode is selected. Alternatively, the processing to change the ratio of the cylinder injection amount $F_D$ and the port injection amount $F_P$ may be omitted and a preset value may be used instead.

Additionally, while an example has been described where the valve overlap period is extended in the DI mode, the valve overlap period may be a constant.

Additionally, while the above-described variable valve actuating mechanism 40 includes the valve lift adjustment mechanism 41 and the valve timing adjustment mechanism 42, it is suffice to provide a mechanism that varies valve timings of at least one of the intake valve 27 and the exhaust valve 28 and a configuration that can provide valve overlap periods.

Additionally, while the above-described embodiment has been described wherein a fuel injection mode is selected using a map that includes the load P on the engine 10 and the rotation speed Ne as arguments, maps or calculation formulae for the selection of a fuel injection mode is not limited to this particular example. A fuel injection mode may be selected by using any parameters that correlate with at least the load P on the engine, or any parameters that correlate with the rotation speed Ne.

DESCRIPTIONS OF REFERENCE SYMBOLS

1 Engine control device
2 Engine load calculation unit
3 Injection control unit (injection controller)
3a Total fuel amount calculation unit
3b Injection mode selection unit
3c Ratio modification unit
3d Injection amount setting unit
3e Injection control signal output unit
4 Supercharging control unit
5 Valve control unit
10 Engine
11 Cylinder injection valve
12 Port injection valve
17 Intake port
18 Exhaust port
20 Cylinder
24 Intake passage
27 Intake valve
28 Exhaust valve
29 Exhaust passage
30 Turbocharger (supercharger)
32 Waste gate valve
40 Variable valve actuating mechanism

The invention claimed is:

1. An engine control device for an engine provided with a supercharger, the engine including a cylinder injection valve for injecting a fuel into a cylinder in the engine; a port injection valve for injecting the fuel into an intake port of the cylinder; and a variable valve actuating mechanism that varies open/close timing of at least one of an intake valve and an exhaust valve of the engine, the engine control device comprising:
    a processor and a non-transitory storage that stores instructions that cause the processor to:
    control, as an injection controller, injections of the fuel through the cylinder injection valve and through the port injection valve, on the basis of at least a load on the engine and a rotation speed of the engine; and
    control, as a variable valve controller, controls the variable valve actuating mechanism on the basis of the load,
    wherein the instructions cause the processor to:
        in a low load operating state, inject the fuel through the port injection valve,
        in an intermediate load operating state, inject the fuel through the cylinder injection valve during an intake stroke, and inject the fuel through the port injection valve;
        in a high load operating state, set an amount of the fuel to be injected through the port injection valve to 0 when the engine is at a low rotation speed, and increase a ratio of an amount of the fuel to be injected through the port injection valve to an amount of fuel to be injected through the cylinder injection valve, as a rotation speed of the engine increases, and inject the fuel through the cylinder injection valve at least during an intake stroke and during a compression stroke;
        at least in the high load operating state, provide a valve overlap period for opening both the intake valve and the exhaust valve; and
        in the high load operating state, increase the valve overlap period when the engine is at the low rotation speed with respect to the valve overlap period when the engine is at the other rotation speed.

2. The engine control device according to claim 1, wherein
    the instructions cause the processor to set a ratio of an amount of the fuel to be injected through the port injection valve to an amount of the fuel to be injected through the cylinder injection valve, to 1 or less, in the high load operating state.

3. The engine control device according to claim 1, wherein
    the instructions cause the processor to, in the high load, high rotation speed operating state, inject the fuel through the port injection valve, and inject the fuel through the cylinder injection valve only during the intake stroke.

* * * * *